US009363822B1

(12) United States Patent
Oroskar et al.

(10) Patent No.: US 9,363,822 B1
(45) Date of Patent: Jun. 7, 2016

(54) METHOD AND SYSTEM FOR ASSIGNING RESOURCES TO USER EQUIPMENT DEVICES (UES)

(71) Applicant: Sprint Spectrum L.P., Overland Park, KS (US)

(72) Inventors: Siddharth S. Oroskar, Overland Park, KS (US); Jasinder P. Singh, Olathe, KS (US); Maulik K. Shah, Austin, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 104 days.

(21) Appl. No.: 14/315,558

(22) Filed: Jun. 26, 2014

(51) Int. Cl.
*H04W 72/10* (2009.01)
*H04W 72/04* (2009.01)
*H04W 28/02* (2009.01)

(52) U.S. Cl.
CPC .............. *H04W 72/10* (2013.01); *H04W 28/02* (2013.01); *H04W 72/04* (2013.01)

(58) Field of Classification Search
None
See application file for complete search history.

(56) References Cited

U.S. PATENT DOCUMENTS

| 2010/0303013 | A1* | 12/2010 | Khandekar | H04W 99/00 370/328 |
| 2011/0103243 | A1* | 5/2011 | Larsson | H04L 5/001 370/252 |
| 2014/0161052 | A1* | 6/2014 | Kazmi | H04L 5/0041 370/329 |
| 2015/0163801 | A1* | 6/2015 | Sadek | H04W 72/0446 370/336 |
| 2015/0208420 | A1* | 7/2015 | Kashiwase | H04W 36/0083 370/230 |
| 2015/0296514 | A1* | 10/2015 | Morioka | H04L 5/0044 370/329 |

FOREIGN PATENT DOCUMENTS

WO    WO/2014/017478    *  1/2014  ............ H04W 28/26

* cited by examiner

*Primary Examiner* — Kodzovi Acolatse

(57) ABSTRACT

A method and system for assigning resources to user equipment devices (UEs) is disclosed. A communication system may include a wireless network that allocates, among a plurality of UEs, resources on a given carrier. The wireless network may support carrier aggregation using a combination of the given carrier and at least one other carrier. The method involves the wireless network making a determination that (i) a first UE is operating without carrier aggregation and (ii) a second UE is operating with carrier aggregation. The method further involves, in response to making the determination, the wireless network giving the first UE higher priority than the second UE for resource assignment on the given carrier.

16 Claims, 6 Drawing Sheets

METHOD AND SYSTEM FOR ASSIGNING RESOURCES TO USER EQUIPMENT DEVICES (UES)

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which wireless communication devices (WCDs) (also known as user equipment devices (UEs)), such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

In general, a cellular wireless network may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of WCDs, initiation of communications, handoff between coverage areas, and functions related to air interface communication.

In accordance with the air interface protocol, each coverage area may operate on one or more carrier frequencies or "carriers." More particularly, the base station that radiates to define a given coverage area may support one or more frequency bands, such as the 800 MHz band (one or more frequency ranges around 800 MHz), the 1.9 GHz band (one or more frequency ranges around 1.9 GHz), and the 2.5 GHz band (one or more frequency ranges around 2.5 GHz), and may provide service on one or more carrier frequencies with each supported band. In a frequency division duplex (FDD) arrangement, different carrier frequencies are used for the downlink than the uplink. Whereas, in a time division duplex (TDD) arrangement, the same carrier frequency is used for the downlink and uplink and is allocated over time among downlink and uplink communications.

On each carrier frequency in a coverage area, the coverage area may also define a number of air interface channels for carrying information between the base station and the WCDs. These channels may be defined in various ways, such as through frequency division multiplexing, time division multiplexing, and/or code-division multiplexing, for instance. By way of example, each coverage area may define a pilot channel, reference channel or other resource on which the base station may broadcast a pilot signal, reference signal, or the like that WCDs may detect as an indication of coverage and may measure to evaluate coverage strength. As another example, each coverage area may define an uplink control channel or other resource on which WCDs may transmit control messages such as registration requests and access requests to the base station. And each coverage area may define a downlink control channel or other resource on which the base station may transmit control messages such as system information messages and page messages to WCDs. Each coverage area may then define one or more traffic channels or other resources for carrying communication traffic such as voice data and other data between the base station and WCDs.

When a WCD first powers on or enters into coverage of the network, the WCD may scan for and identify a strongest pilot or reference signal and may register with the network by transmitting a registration request or attach request to a base station providing that signal. This registration process may serve to notify the network of the WCD's presence in a particular coverage area and to facilitate network authentication of the WCD. Once registered, the WCD may then operate in an idle mode in which the WCD monitors a downlink control channel to receive overhead information and to check for any page messages. In the idle mode, the WCD may have no assigned traffic channel resources on which to engage in bearer communication.

When the network has a communication (such as a voice call or other traffic) to provide to a WCD that is registered with the network but is operating in the idle mode, the network may page the WCD in an effort to then facilitate assigning traffic channel resources to the WCD. In particular, the network may transmit on the downlink a page message addressed to the WCD. Assuming the WCD receives this page message, the WCD may then transmit to the network a page response message on the uplink. And upon receipt of the page response message, the network may then assign traffic channel resources to the WCD, for use to carry the communication, thus transitioning the WCD to a connected or active mode in which the WCD can engage in the communication.

Likewise, when an idle WCD seeks to initiate a communication (such as to place a voice call or engage in other bearer communication), the WCD may transmit on the uplink to the base station an origination or connection request, and the network may then assign traffic channel resources to the WCD for use to carry the communication, similarly transitioning the WCD to a connected or active mode in which the WCD can engage in the communication.

The network may serve UEs operating in the network by using carrier aggregation. For instance, for UEs that are configured to operate with carrier aggregation, the network may serve the UEs by using a combination of a first carrier and at least one other carrier.

OVERVIEW

A method and system for assigning resources to user equipment devices (UEs) is disclosed. An example method is operable in a communication system comprising a wireless network that allocates, among a plurality of UEs, resources from a first set of resources and a second set of resources. The method involves the wireless network operating in a first mode in which the wireless network gives a first UE and a second UE equal priority for resource assignment from the first set of resources. The method further involves the wireless network making a determination that (i) the first UE is operating using resources from only the first set of resources and (ii) the second UE is operating using resources from the first set of resources and the second set of resources. Still further, the method involves, in response to making the determination, the wireless network switching from operating in the first mode to operating in a second mode in which the wireless network gives the first UE higher priority than the second UE for resource assignment from the first set of resources.

In another example, the method is operable in a communication system comprising a wireless network that allocates, among a plurality of UEs, resources on a given carrier. Further, the wireless network supports carrier aggregation using a combination of the given carrier and at least one other carrier. The method involves the wireless network making a determination that (i) a first UE is operating without carrier aggregation and (ii) a second UE is operating with carrier aggregation. The method further involves, in response to making the determination, the wireless network giving the first UE higher priority than the second UE for resource assignment on the given carrier.

In another example, the method is operable in a communication system comprising a wireless network that allocates, among a plurality of UEs, resources on a given carrier. Further, the wireless network supports carrier aggregation using a combination of the given carrier and at least one other carrier. The method involves the wireless network operating in a first mode in which the wireless network gives a first UE and a second UE equal priority for resource assignment on the given carrier. Further, the method involves the wireless network making a first determination that (i) the first UE is operating without carrier aggregation and (ii) the second UE is operating with carrier aggregation. Still further, the method involves the wireless network making a second determination that the first UE is engaged in a ramp-up process. Yet still further, the method involves, in response to making the first and second determinations, the wireless network switching from operating in the first mode to operating in a second mode in which the wireless network gives the first UE higher priority than the second UE for resource assignment on the given carrier.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
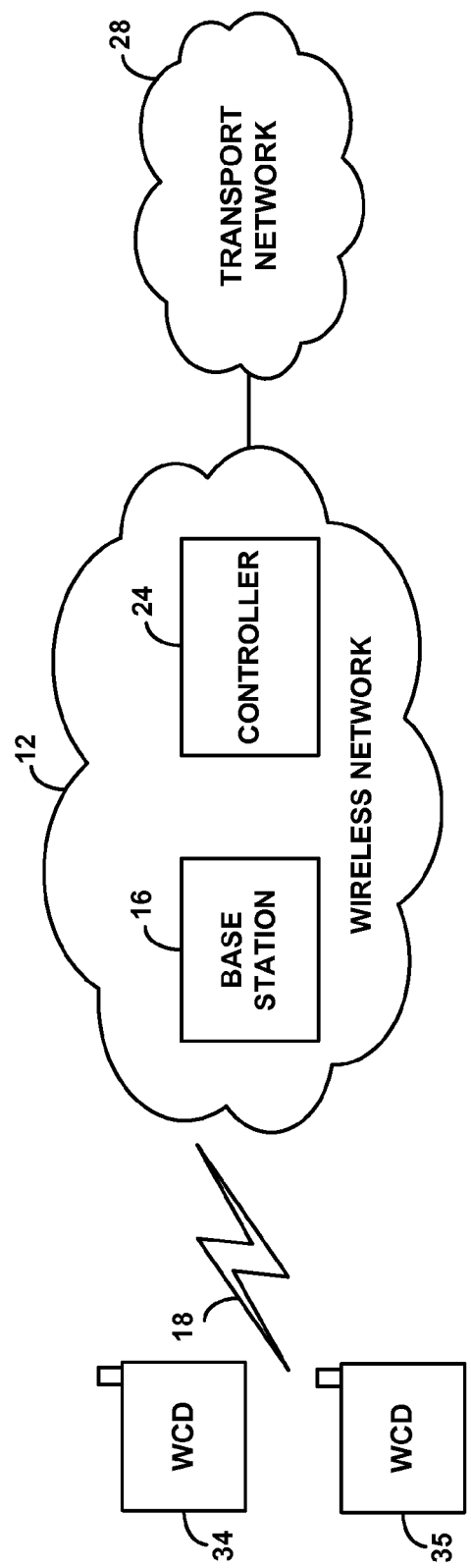
FIG. 1 is a simplified block diagram of a network arrangement in which an exemplary embodiment of the present method and apparatus can be implemented.

1. Overview of an Example Method and System

Disclosed herein is a method and system for assigning resources to user equipment devices (UEs).

A wireless network may have a limited amount of resources available to allocate to UEs that the wireless network serves. Further, a wireless network may serve UEs using resources from different sets of resources, such as a first set and a second set. The wireless network may allocate these resources from the different sets of resources in various ways. For instance, the wireless network may serve some UEs by using resources from only the first set of resources, and the wireless network may serve other UEs by using resources from only the second set of resources. Additionally, the wireless network may serve other UEs by using a combination of resources from both the first set of resources and the second set of resources.

In a common example, resources from a first set of resources are resources on a first carrier and resources from a second set of resources are resources on a second carrier. Further, the wireless network may support carrier aggregation using a combination of resources from the first carrier and resources from the second carrier. Notably, some UEs may be capable of operating with carrier aggregation while other UEs may not be capable of operating with carrier aggregation. If a UE is capable of operating with carrier aggregation, the wireless network may serve that UE by using a combination of resources from the first carrier and the second carrier. On the other hand, the wireless network may serve UEs not capable of operating with carrier aggregation on just a single carrier (e.g., on just the first carrier).

Still further, when a wireless network is serving a UE, the wireless network typically determines a resource-allocation rate at which to assign resources to the UE. The wireless network may determine this resource-allocation rate based the type and quality of service to be provided to the UE. For instance, the wireless network may determine the resource-allocation rate based on various factors such as a channel quality indicator (CQI) for the UE, a sounding reference signal (SRS) evaluation for the UE, and/or amount of data transmitted to or from the UE. Rather than initially assigning to the UE resources at this determined resource-allocation rate, the wireless network may instead engage in a ramp-up process in order to ramp up over time its allocation to the determined rate.

In practice, a UE operating with carrier aggregation may have better service overall than a UE not operating with carrier aggregation. In particular, a UE operating with carrier aggregation may experience better service, because the UE operating with carrier aggregation may have more resources available to it than a UE operating without carrier aggregation. The greater availability of resources may allow a UE operating with carrier aggregation to ramp-up more quickly than a UE operating without carrier aggregation. Further, even after a UE has ramped up to its determined resource-allocation rate, a UE operating with carrier aggregation may still experience better service than a UE operating without carrier aggregation. It may therefore be desirable for the wireless network to provide UEs operating without carrier aggregation some other user-benefit experience.

Therefore, the disclosed method and system offer an improved way to assign resources to UEs operating in a wireless network that supports carrier aggregation. In particular, the disclosed method may involve giving a UE operating without carrier aggregation (e.g., using resources only on a single given carrier) higher priority for resource assignment on that given carrier than another UE that is operating with carrier aggregation (e.g., using resources on the given carrier and a second carrier different from the given carrier).

In accordance with at least one embodiment, the method is operable in a communication system comprising a wireless network that allocates, among a plurality of UEs, resources from a first set of resources and a second set of resources. The method involves the wireless network operating in a first mode in which the wireless network gives a first UE and a second UE equal priority for resource assignment from the first set of resources. The method further involves the wireless network making a determination that (i) the first UE is operating using resources from only the first set of resources and (ii) the second UE is operating using resources from the first set of resources and the second set of resources. Still further, the method involves, in response to making the determination, the wireless network switching from operating in the first mode to operating in a second mode in which the wireless network gives the first UE higher priority than the second UE for resource assignment from the first set of resources.

Beneficially, the improved way of assigning resources may help to provide improved service for UEs operating without carrier aggregation. For example, the disclosed method and system may allow a UE operating without carrier aggregation to experience the same availability of overall resources that a UE operating with carrier aggregation would. As another example, a UE operating without carrier aggregation may ramp-up more quickly than it otherwise would have. As a result, under the disclosed method, the ramp-up time for a UE operating without carrier aggregation may be substantially the same as the ramp-up time for another UE operating with carrier aggregation.

2. Example Communication System Architecture

As noted above, FIG. 1 is a simplified block diagram of a network arrangement in which an exemplary embodiment of the present method and system can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

The arrangement of FIG. 1 includes by way of example a representative access network 12, which may function to provide WCDs with air interface coverage and connectivity with one or more transport networks such as the PSTN and the Internet. As such, network 12 may include multiple base stations that radiate to provide one or more respective coverage areas defining an air interface in which to exchange control and bearer data with WCDs. For simplicity in the arrangement shown, for instance, network 12 includes a representative base station 16 that radiates to provide a coverage area 18. As discussed above, coverage area 18 may operate on one or more carriers and network 12 may support carrier aggregation using these one or more carriers.

Network 12 may then further include various network infrastructure to support setup of connections and communications and/or to provide connectivity with transport networks. This network infrastructure may take various forms and include any of a variety of network elements, including for instance a controller of one form or another. For instance, in the arrangement shown, network 12 includes a respective controller 24. Network 12 is then shown providing connectivity with a representative transport network 28. In an example implementation, transport network 28 might be the Internet. In another example, transport network 28 might be the PSTN.

With the arrangement shown in FIG. 1, two WCDs 34 and 35 are shown positioned in coverage of network 12. When a WCD such as WCD 34 or 35 first powers on or arrives in coverage of network 12, the WCD may scan for and detect coverage provided by network 12 and may responsively register with network 12 by transmitting in coverage area 18 to base station 16 a registration request. In response, network 12 (e.g., controller 24) may then record the fact that the WCD is present within coverage area 18 served by base station 16, so as to facilitate paging the WCD for calls or other incoming communications. The WCD may then idle in coverage area 18 of network 12. Further, the WCD may transition to active mode when the WCD seeks to initiate a communication or when the network has a communication to provide to the WCD.

Figure 2:
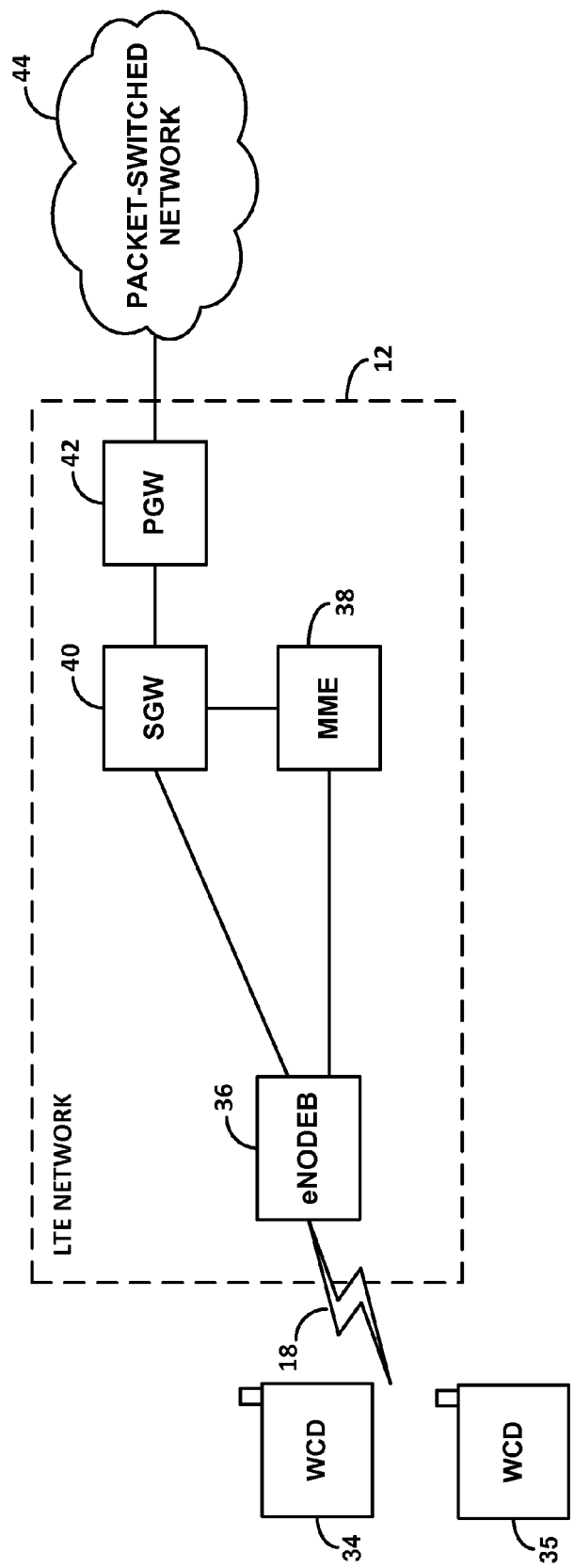
FIG. 2 is a simplified block diagram of a more specific network arrangement in which the exemplary embodiment can be implemented.

FIG. 2 is next a more specific block diagram depicting an example implementation of the network arrangement shown in FIG. 1. In the arrangement of FIG. 2, network 12 is an LTE network that primarily serves WCDs with wireless packet data communication service (including perhaps voice-over-packet and other packet-based real-time media service). In another example, however, network 12 may be a CDMA network that primarily serves WCDs with circuit-switched voice call service (but may also provide packet-data communication service and other types of service). Network 12 could take other forms as well, using other protocols such as WiMAX, GSM, or others now known or later developed.

The LTE network 12 in this arrangement is shown including a representative LTE base station 36 known as an eNodeB, which includes an antenna structure and associated equipment for engaging in LTE communication over the air interface of coverage area 18 with WCDs. The eNodeB 36 is then shown coupled with an MME 38 that serves as controller 24 and particularly as a signaling controller for the LTE network. Further, the eNodeB 36 is also shown coupled with a serving gateway (SGW) 40, which may then be coupled with a packet-gateway (PGW) 42 that connects with a packet-switched network 44. And the MME 38 is shown coupled with the SGW 40. Although the elements of the LTE network 12 are shown with direct connections between them, in a likely arrangement, the elements may sit as nodes on a core packet network, and thus the illustrated connections may be logical interfaces between the elements over that network.

In practice, the LTE eNodeB 36 may broadcast an overhead signal and the WCD may then detect this broadcast signal and responsively register in coverage area 18 with the LTE network. Under LTE principles, the WCD may do so by transmitting an attach request to the eNodeB 36. Upon receipt of this attach request, the LTE network may register presence of the WCD in coverage area 18 of eNodeB 36. For instance, eNodeB 36 may signal to MME 38 to trigger this registration. The LTE network may then serve the WCD.

LTE network 12 may be configured to serve UEs such as WCDs 34 and 35. LTE network 12 may serve these UEs by allocating resources to the UEs operating in the network. Further, as indicated above, LTE network 12 may be configured to allocate, among a plurality of UEs, resources from various sets of resources, such as a first set of resources and a second set of resources. Still further, LTE network 12 may serve some UEs by using resources from only a single set of resources, but the LTE network may serve other UEs by using a combination of resources from the various sets of resources. For instance, with reference to FIG. 2, UE 34 may be operating using resources only from the first set of resources (e.g., resources on a first carrier), and UE 35 may be operating using a combination of resources from both the first set of resources and the second set of resources (e.g., resources on the first carrier and resources on the second carrier).

Although the resources described herein are described primarily with respect to a first and second set of resources (e.g., resources on a first carrier and a second carrier), it should be understood that the sets of resources from which the network 12 allocates resources may also include additional sets of resources. For instance, LTE network 12 may use resources on a third carrier, resources on a fourth carrier, and so forth, to serve UEs with carrier aggregation. Under carrier aggregation in LTE, the component carriers that the network aggregates typically have a bandwidth of 1.4, 3.5, 10, 15, or 20 MHz. Further, LTE network 12 may use contiguous carriers within the same frequency band. This is commonly referred to as intra-band contiguous carrier aggregation. In another example, LTE network 12 may use non-contiguous carriers that are within the same frequency band but have a gap or gaps between them. This is commonly referred to as intra-band non-contiguous carrier aggregation. In yet another example, LTE network 12 may use non-contiguous carriers that belong to one or more different frequency bands. This is commonly referred to as inter-band non-contiguous carrier aggregation.

3. Example Network Element Components

Figure 3:
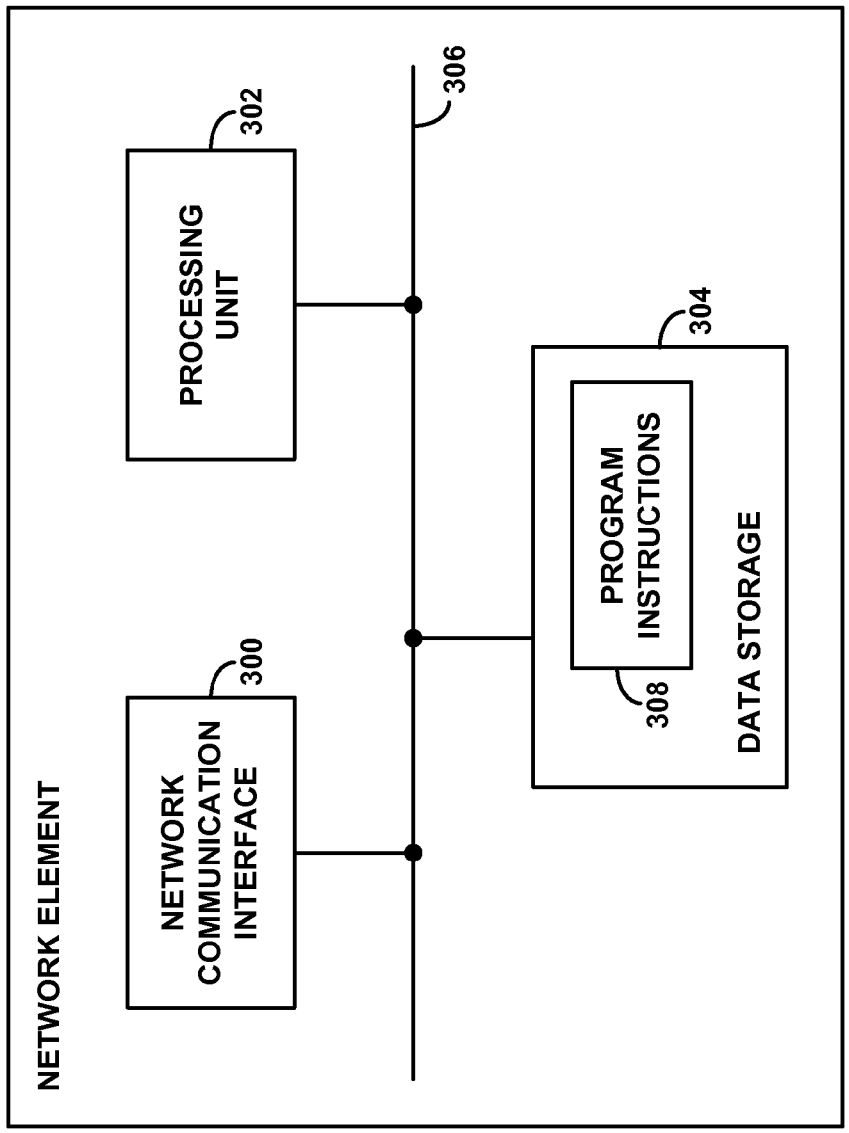
FIG. 3 is a simplified block diagram of a network element operable in a network arrangement such as that depicted in FIGS. 1 and 2.

FIG. 3 is next a simplified block diagram of a network element showing some of the physical components that such an element may include. Network elements may also be referred to herein as network nodes. This block diagram may represent any of a variety of the network elements shown in FIGS. 1 and 2 for instance.

As shown in FIG. 3, the network element includes a network communication interface 300, a processing unit 302, and data storage 304, all of which may be communicatively linked together by a system bus, network, or other connection mechanism 306. Although the figure shows these components as discrete blocks, it should be understood that the components can be integrated together or distributed in various ways, and one or more components could be omitted altogether.

With this arrangement, the network communication interface 300 may function to provide for communication with various other network elements and may thus take various forms, allowing for wired and/or wireless communication for instance. Network communication interface 300 may, for example, comprise one or more antenna structures, one or more power amplifiers, and associated equipment, for engaging in communication with wireless communication devices operating within the coverage of the wireless network, according to one of the air interface protocols noted above for instance.

Processing unit 302 may then comprise one or more general purpose processors (e.g., microprocessors) and/or one or more special purpose processors (e.g., application specific integrated circuits) and may be integrated in whole or in part with the network communication interface. And data storage 304 may comprise one or more volatile and/or non-volatile storage components, such as optical, magnetic, or flash memory and may be integrated in whole or in part with the processing unit. As shown, by way of example, data storage 304 may then comprise program instructions 308, which may be executable by processing unit 302 to carry out various functions described herein.

In an exemplary embodiment, data storage 304 may include program instructions that are executable to cause a wireless network (e.g., LTE network 12) or at least one component of the wireless network to perform functions comprising: (i) the wireless network operating in a first mode in which the wireless network gives a first UE and a second UE equal priority for resource assignment from the first set of resources; (ii) the wireless network making a determination that (a) the first UE is operating using resources from only the first set of resources and (b) the second UE is operating using resources from the first set of resources and the second set of resources; and (iii) in response to making the determination, the wireless network switching from operating in the first mode to operating in a second mode in which the wireless network gives the first UE higher priority than the second UE for resource assignment from the first set of resources.

4. Example Operation i. A First Example Method

Figure 4:
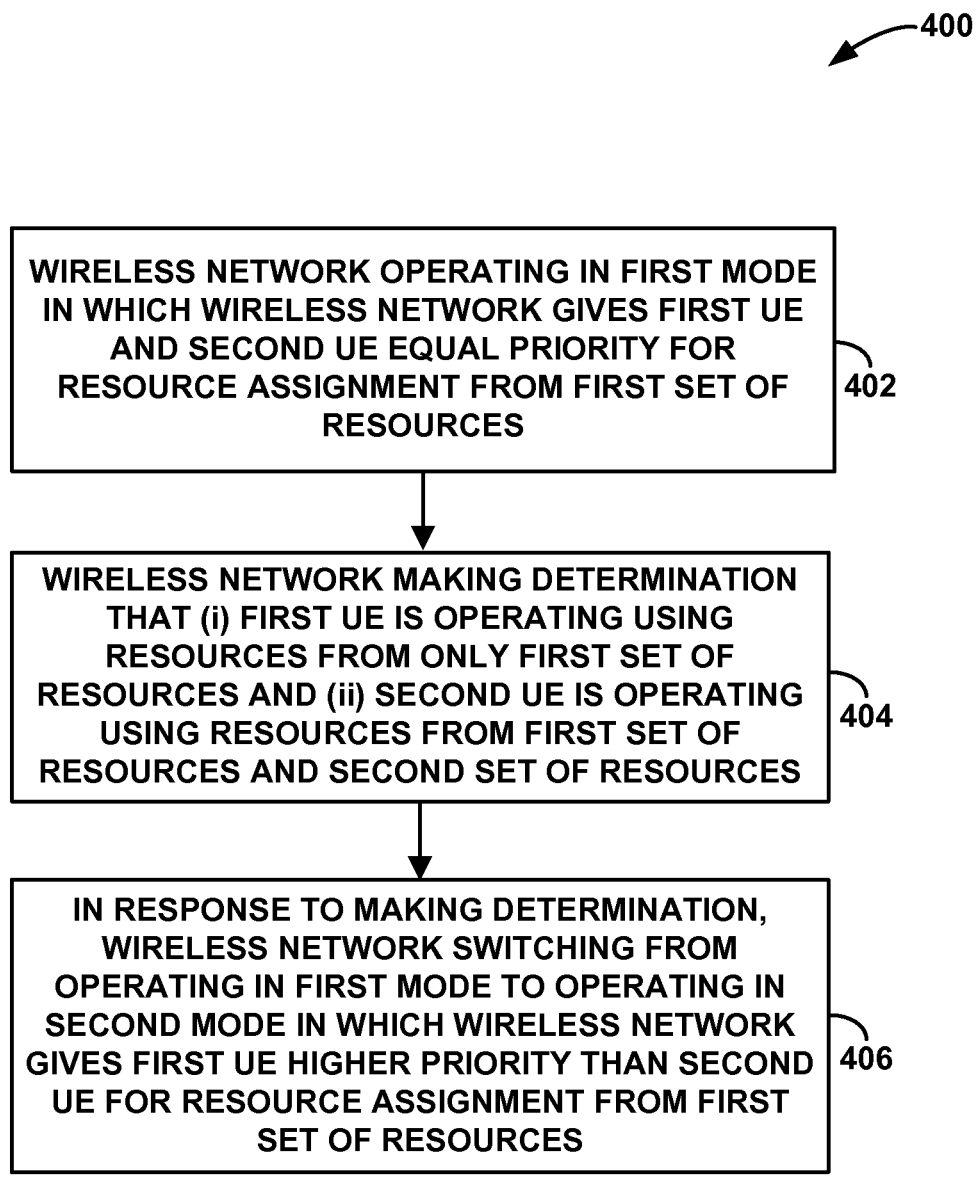
FIG. 4 is a flow chart depicting functions that can be carried out in accordance with an example method.

FIG. 4 is next a flow chart depicting a method 400 that can be carried out in accordance with the present disclosure, in an arrangement such as that depicted in FIG. 1 or in FIG. 2 for instance, and that can thus be implemented by one or more of the illustrated network elements as discussed above.

Method 400 is a method that is operable in a communication system comprising a wireless network that allocates, among a plurality of UEs, resources from a first set of resources and a second set of resources. As shown in FIG. 4, at block 402, the method involves the wireless network operating in a first mode in which the wireless network gives a first UE and a second UE equal priority for resource assignment from the first set of resources. The method further involves, at block 404, the wireless network making a determination that (i) the first UE is operating using resources from only the first set of resources and (ii) the second UE is operating using resources from the first set of resources and the second set of resources. Still further, the method involves, at block 406, in response to making the determination, the wireless network switching from operating in the first mode to operating in a second mode in which the wireless network gives the first UE higher priority than the second UE for resource assignment from the first set of resources.

In an example embodiment, these functions of method 400 could be carried out by a wireless network such as LTE network 12 illustrated in FIG. 2. Still further, the method 400 may be carried out by a component or a combination of components of the LTE network 12. For example, the method may be carried out by a wireless network node such as eNodeB 36 or MME 38, or the method may be carried out by a combination of network elements such as eNodeB 36 and MME 38. Other examples are possible as well.

The resources from the first set of resources and the second set of resources may be any suitable resources for serving UEs operating in the coverage of LTE network 12. Further, the sets of resources may be defined in a variety of ways. In general, the first and second sets are defined such that the LTE network is serving one or more UEs using resources only from the first set, while the network is serving one or more other UEs using a combination of resources from both the first set and the second set. For example, the resources from the first set of resources may be resource blocks on a first carrier and not on a second carrier, and the resources from the second set of resources may be resource blocks on the second carrier and not on the first carrier. As another example, the resources from the first set of resources may be a first time slot on a first carrier, and the resources from the second set of resources may be second time slot on a second carrier and not on the first carrier. Other example resources and sets of resources are possible as well.

Under LTE, the network typically dynamically schedules uplink and downlink resources such as resource blocks to UEs by taking into account various factors. For example, the network may dynamically schedule these resources taking into account user traffic volume, traffic types, quality-of-service (QoS) objectives, and so forth. Further, under LTE, scheduling is typically performed on a transmission time interval basis (TTI) basis. Each TTI is one (1) millisecond and typically includes two resource blocks. Further, each resource block typically includes a number of sub-carriers, such as 12 consecutive sub-carriers (e.g., 180 kHz). The number of resource blocks available for allocation in a network may vary. For example, a channel bandwidth of 5 MHz typically has 25 resource blocks available for allocation per 1 ms, a channel bandwidth of 10 MHz typically has 50 resource blocks available for allocation per 1 ms, a channel bandwidth of 15 MHz typically has 75 resource blocks available for allocation per 1 ms, and a channel bandwidth of 20 MHz typically has 100 resource blocks available for allocation per 1 ms. Other examples are possible as well.

Further, since LTE network 12 has a limited amount of resources to assign (e.g., a limited number of resource blocks available for allocation), the LTE network may determine priority for assigning these resources to the various UEs using the resources. In particular, when assigning resources from a given set of resources to UEs operating in the network, LTE network 12 may give, to each UE using resources from the given set of resource, a given priority for resource assignment from the given set of resources. For instance, LTE network 12 may give UEs equal priority for resource assignment from the given set of resources. Alternatively, LTE network 12 may give some UEs higher or lower priority for resource assignment from the given set of resources than other UEs.

The act of giving priority for resource assignment from a set of resources to UEs 34 and 35 may take various forms. In a common example, LTE network 12 may implement a scheduling algorithm to assign resources to UEs operating in the network. An example scheduling algorithm that may be implemented by LTE network 12 is:

$$\max_{\{S_U\}} \sum_u \frac{w_u}{(R_u)^\alpha} r_u(S_u).$$

In this algorithm, (i) $S_U$ denotes a particular set of physical resource blocks (PRBs) allocated to a user u. (In the uplink this may be contiguous in frequency given the SC-FDMA constraint); (ii) $r_u(Su)$ is the rate achievable by user u when given resources Su; (iii) $w_u$ is a per-user weighting factor that enforces QoS constraints (e.g. min bitrate, packet delay budget, etc.) for a given bearer; (iv) $R_u$ is the average rate achieved by user U over a prescribed time window; and (v) a is a fairness factor where $\alpha=0$ results in maximum carrier-to-interference ratio (max C/I) scheduling, $\alpha=1$ results in proportional fairness (PF) scheduling. Under this example algorithm, a lower a value results in a higher priority being assigned to a UE for resource assignment. For instance, setting $\alpha$ to 0 results in the schedule being biased toward the user u (e.g., a higher priority to user u as compared to other users with a higher a values), whereas setting $\alpha$ to 1 results in a schedule that is fair or equal among UEs while assigning resources to UEs (e.g., an equal priority to user u as compared to other users with $\alpha=1$).

a. Operating in the First Mode

Returning to FIG. 4, at block 402, LTE network 12 may operate in a first mode in which the LTE network gives UEs such as UE 34 and UE 35 equal priority for resource assignment from the first set of resources.

Giving UE 34 and UE 35 equal priority for resource assignment from the first set of resources may take various forms. For example, giving UE 34 and UE 35 equal priority for resource assignment from the first set of resources may involve assigning the same amount of resources from the first set of resources to the first UE and to the second UE. For instance, LTE network 12 may assign UE 34 and UE 35 the same number of resource blocks over a given period of time.

In another example, giving the UE 34 and UE 35 equal priority for resource assignment from the first set of resources may involve implementing PF scheduling for assigning resources to UEs 34 and 35. Under PF scheduling, LTE network 12 typically allocates more resources to UEs that are operating with relatively better channel quality. As a UE moves further from an eNodeB, PF scheduling would typically allocate fewer resources (and provide less throughput) due to the weaker radio link. This type of scheduling results in scheduling that balances between fairness and throughput.

LTE network 12 may implement PF scheduling and thus give equal priority to UE 34 and UE 35 for resource assignment from the first set of resources in various ways. In an example embodiment, LTE network 12 implements PF scheduling by (i) implementing the algorithm discussed above and (ii) setting $\alpha$ to 1 for each UE. Setting $\alpha$ to 1 for UEs 34 and 35 results in a fair or equal amount of resources from the first set of resources being allocated to UEs 34 and 35. For example, in a case where (i) RF conditions are the same for UEs 34 and 35 and (ii) the UEs have the same data requirements, PF scheduling would result in the UEs being allocated the same amount of resources over a given period of time. In a particular example, UEs 34 and 35 may be operating in the same RF conditions and may also each have a resource-allocation rate of 10 resource blocks per a given period of time. Setting $\alpha$ to 1 for each UE may then result in both UEs 34 and 35 receiving 10 resource blocks in that period of time. Other examples of PF scheduling are possible as well.

In another example, giving the UE 34 and UE 35 equal priority for resource assignment from the first set of resources may involve implementing round robin (RR) scheduling in which the scheduler assigns resources cyclically without taking channel conditions into account.

b. Making the Determination that (i) the First UE is Operating Using Resources from Only the First Set of Resources and (ii) the Second UE is Operating Using Resources from the First Set of Resources and the Second Set of Resources At block 404, LTE network 12 makes a determination that (i) UE 34 is operating using resources from only the first set of resources and (ii) UE 35 is operating using resources from the first set of resources and the second set of resources. In an example, making this determination involves LTE network 12 determining that it is (i) serving UE 34 using resources from only the first set and (ii) is serving UE 35 using resources from both the first set and the second set. For instance, LTE network 12 may determine that it is using carrier aggregation to serve UE 35 but is not using carrier aggregation to serve UE 34.

In an example embodiment, LTE network 12 determines whether it is serving a UE with or without carrier aggregation by determining whether the UE is registered as a carrier-aggregation device. When a UE registers with LTE network 12, the UE may send a message to the network indicating whether the UE is capable of operating with carrier aggregation. LTE network 12 may then register the UE as either a carrier-aggregation-capable device or a non-carrier-aggregation capable device. Further, LTE network 12 may then serve each carrier-aggregation-capable device using carrier aggregation, and the LTE network may serve each non-carrier-aggregation capable device without using carrier aggregation.

In another example, although a UE may be capable of operating with carrier aggregation, for one reason or another, LTE network 12 may elect to serve the UE using resources only on a single carrier. In such as case, even though the UE may be capable of being served with carrier aggregation, since LTE network 12 is serving the UE only on a single carrier, the LTE network would determine that such a UE is operating without carrier aggregation. For instance, both UE 34 and UE 35 may be capable of operating with carrier aggregation, but for one reason or another, LTE network 12 may only be using carrier aggregation for UE 35. In such an example, LTE network 12 would determine that (i) UE 34 is operating using resources from only the first set of resources and (ii) UE 35 is operating using resources from the first set of resources and the second set of resources.

c. Switching from Operating in the First Mode to Operating in the Second Mode At block 406, in response to making the determination of block 404, LTE network 12 switches from operating in the first mode to operating in a second mode in which the wireless network gives UE 34 higher priority than UE 35 for resource assignment from the first set of resources.

The act of assigning higher priority for resource assignment from the first set of resources may take various forms. For instance, giving the UE 34 higher priority than UE 35 for resource assignment from the first set of resources may involve assigning more resources from the first set of resources to the UE 34 than to the UE 35. In an example embodiment, assigning more resources from the first set of resources to UE 34 than to UE 35 includes assigning a greater number of resource blocks from the first set of resources to the first UE than to the second UE. As a particular example, in this second mode, LTE network 12 (i) assigns 20 resource blocks from the first set of resources to UE 34 over a given period of time and (ii) only assigns 10 resource blocks from the first set of resources to UE 35 over the same period of time.

In another example, giving higher priority for resource assignment from the first set of resources to UE 34 may involve assigning to UE 34 resources from the first set of resources so as to allow UE 34 to meet its service requirements over a given period before assigning to UE 35 any resources from the first set of resources.

In yet another example, switching from the first mode to the second mode may involve stopping using PF scheduling for UEs 34 and 35 and instead giving higher priority for resource assignment from the first set of resources to UE 34 than to UE 35. Continuing the example scheduling algorithm discussed above, giving the UE 34 higher priority than UE 35 for resource assignment from the first set of resources may involve setting α to different values for UE 34 and UE 35. In particular, LTE network 12 may set α closer to zero for UE 34 than for UE 35. This will result in giving UE 34 higher priority for resource assignment. For example, LTE network 12 may set α to zero for UE 34 while keeping a at 1 for UE 35. In another example, LTE network may set α to 0.5 for UE 34 while keeping α at 1 for UE 35. Other examples are possible as well.

In this second mode, since LTE network 12 gives UE 34 higher priority for resource assignment from the first set of resources, UE 34 may thus receive more resources (e.g., resource blocks) from the first set over a given period of time than UE 35 does. However, since UE 35 is operating using carrier aggregation, UE 35 may also be assigned resources from the second set of resources. Therefore, even though UE 35 may be allocated fewer resources from the first set of resources, it is possible that UE 35 would still receive from LTE network 12 the same amount or perhaps a larger amount of overall resources.

d. Consideration of Whether UEs are Engaged in Ramp-Up Process

In the method 400, LTE network 12 may also take into account whether the UEs are engaged in a ramp-up process. As mentioned above, when a wireless network begins serving a UE, the wireless network may determine a resource-allocation rate to the UE. In accordance with the disclosure, a ramp-up process is a process in which the network first allocates less than a given resource-allocation rate for the UE and then ramps up the allocation to the given resource-allocation rate over a period of time. This ramp-up process may include a plurality of steps where the LTE network increases the allocation rate at each step.

As a particular example, LTE network 12 may select for UE 34 a resource-allocation rate R that is determined based on the UE's requested service. An example ramp-up process may involve a first step in which LTE network 12 allocates resources to UE 34 at a rate of 0.25×R. LTE network 12 may then determine whether UE 34 is able to communicate without having problems or issues communicating with the LTE network at this rate. Problems or issues may, for instance, involve UE 34 not receiving some or all of the data from LTE network 12.

LTE network 12 may determine whether UE 34 is able to communicate at this rate without problem in various ways. For example, LTE network 12 may determine that UE 34 is unable to communicate at this rate if the LTE network does not receive a response from the UE within a predetermined period of time. In another example, Negative-Acknowledgment (NAK) messages or the like may indicate failure of communication at a given step. An NAK message may, for instance, indicate some type of error, such as the UE being unable to successfully receive complete messages from the network.

If UE 34 is able to successfully communicate at the 0.25×R rate, the ramp-up process may then involve a second step in which LTE network 12 allocates resources to UE 34 at a rate of 0.5×R. Once again, LTE network 12 may then determine whether UE 34 is able to communicate at this rate without problem. If UE 34 is able to successfully communicate at this rate, the ramp-up process may then involve a third step in which LTE network 12 allocates resources to UE 34 at a rate of 0.75×R. Yet again, LTE network 12 may then determine whether UE 34 is able to communicate at this rate without problem. Finally, if UE 34 is able to successfully communicate at this rate, LTE network 12 then allocates resources to UE 34 at the resource-allocation rate R. Other example ramp-up processes are possible as well.

The amount of time in which a UE completes its ramp-up process may vary. For example, a ramp-up process may take between 50 ms and 500 ms or higher. However, a ramp-up process may take more or less time. Further, as mentioned above, the ramp up process can be quicker for carrier-aggregation-capable UEs than for non-carrier-aggregation-capable UEs, since there are more resource blocks available to a UE with carrier aggregation. Greater resource-block availability will allow a UE to be able to send and/or receive more data, resulting in higher throughput.

Therefore, although a UE operating with carrier aggregation and a UE operating without carrier aggregation may have the same resource-allocation rate, the ramp-up process may take longer for the UE operating without carrier aggregation. For example, a ramp-up process to rate R for UE 35 operating with carrier aggregation may take 100 ms, while a ramp-up process to rate R for UE 34 operating without carrier aggregation may instead take 250 ms.

Giving a UE operating without carrier aggregation higher priority for resource allocation from the first set of resources while the UE is ramping up may help improve the ramp-up time. This may be a particularly beneficial time at which to implement the disclosed method. Therefore, method 400 may also involve LTE network 12 determining that UE 34 is engaged in a ramp-up process. Further, in addition to being responsive the determination of block 404, switching from operating in the first mode to operating in the second mode may be further responsive to determining that UE 34 is engaged in the ramp-up process. By giving UE 34 higher priority during the ramp-up process, the UE will ramp-up more quickly than it otherwise would have.

In an example embodiment, LTE network 12 may give UE 34 higher priority than UE 35 for resource assignment from the first set of resources while UE 34 is engaged in the ramp-up process but not after the ramp-up process is complete. Therefore, after the ramp-up process is complete, LTE network 12 may return to operating in the first mode where LTE network 12 gives both UE 34 and UE 35 equal priority for resource assignment from the first set of resources. Thus, in an example, the method 400 involves, after switching to operating in the second mode, LTE network 12 determining that the ramp-up process for UE 34 is complete. Responsive to determining that the ramp-up process is complete, LTE network 12 then switches from operating in the second mode back to operating in the first mode.

However, in other examples, LTE network 12 may continue to give UE 34 higher priority than UE 35 for resource assignment from the first set of resources even after UE 34 has completed the ramp-up process. In practice, a UE operating with carrier aggregation may receive better service than a full ramped-up UE operating without carrier aggregation, since the UE operating with carrier aggregation may have more resources available to it than a UE operating without carrier aggregation. Therefore, the method 400 may involve, after UE 34 completes the ramp-up process, LTE network 12 continuing to operate in the second mode in which the network gives UE 34 higher priority than UE 35 for resource assignment from the first set of resources.

When giving UE 34 higher priority for resource allocation from the first set, the amount of additional resources from the first set given to UE 34 (compared to the amount given to UE 35) may vary. In an example embodiment, the LTE network 12 may allocate resources such that the ramp-up process for a UE operating with carrier aggregation and the ramp-up process for a UE operating without carrier aggregation take approximately the same amount of time. For example, LTE network 12 may determine that both UE 34 and UE 35 are engaged in a ramp-up process. LTE network 12 may give UE 34 higher priority than UE 35 for resource assignment such that the network assigns (i) a higher amount of resources from the first set of resources to UE 34 but (ii) a lower amount of resources from the first set of resources to UE 35. In this example, the respective amounts may be selected such that UE 34 completes the ramp-up process in an amount of time that is substantially the same as an amount of time UE 35 takes to complete the ramp-up process. For instance, UEs 34 and 35 may each be engaged in a ramp-up process in which each will use 50 resource blocks over a given period of time. Over this given period of time, LTE network 12 may assign 50 resource blocks to UE 34 and only 25 resource blocks to UE 35. However, using another set of resources, LTE network 12 may assign UE 35 an additional 25 resource blocks on another carrier. Since UEs 34 and 35 receive the same amount of overall resources, the ramp-up time for UEs 34 and 35 may take approximately the same amount of time. Other examples are possible as well.

ii. A Second Example Method

Figure 5:
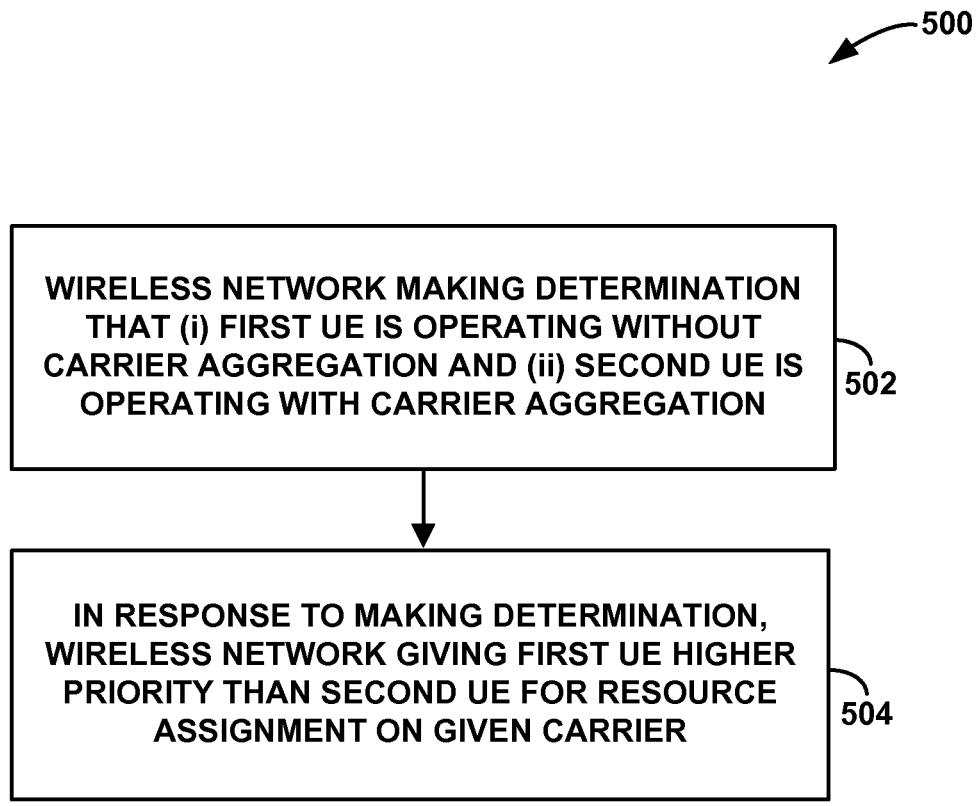
FIG. 5 is another flow chart depicting functions that can be carried out in accordance with an example method.

FIG. 5 is next another flow chart depicting a method 500 that can be carried out with a network arrangement such as that shown in FIG. 1 or FIG. 2 for instance. For example, method 500 may be carried out by a wireless network such as wireless network 12. Furthermore, method 500 is similar in some respects to the method 400, and thus is not described in as great of detail. It should be explicitly noted, however, that any possibilities and permutations described above with respect to method 400 may equally apply to method 500, and vice versa.

As shown in FIG. 5, method 500 involves, at block 502, the wireless network making a determination that (i) a first UE is operating without carrier aggregation and (ii) a second UE is operating with carrier aggregation. The method then involves, at block 504, in response to making the determination, the wireless network giving the first UE higher priority than the second UE for resource assignment on the given carrier.

The wireless network may make this determination of block 502 at various times. In an example embodiment, the wireless network makes this determination at the time the UEs register with the wireless network. In another example, the wireless network makes this determination when one or more UEs are engaged in a ramp-up process. Other examples times at which the wireless network may make this determination (and responsively gives higher priority to the first UE) are possible as well.

iii. A Third Example Method

Figure 6:
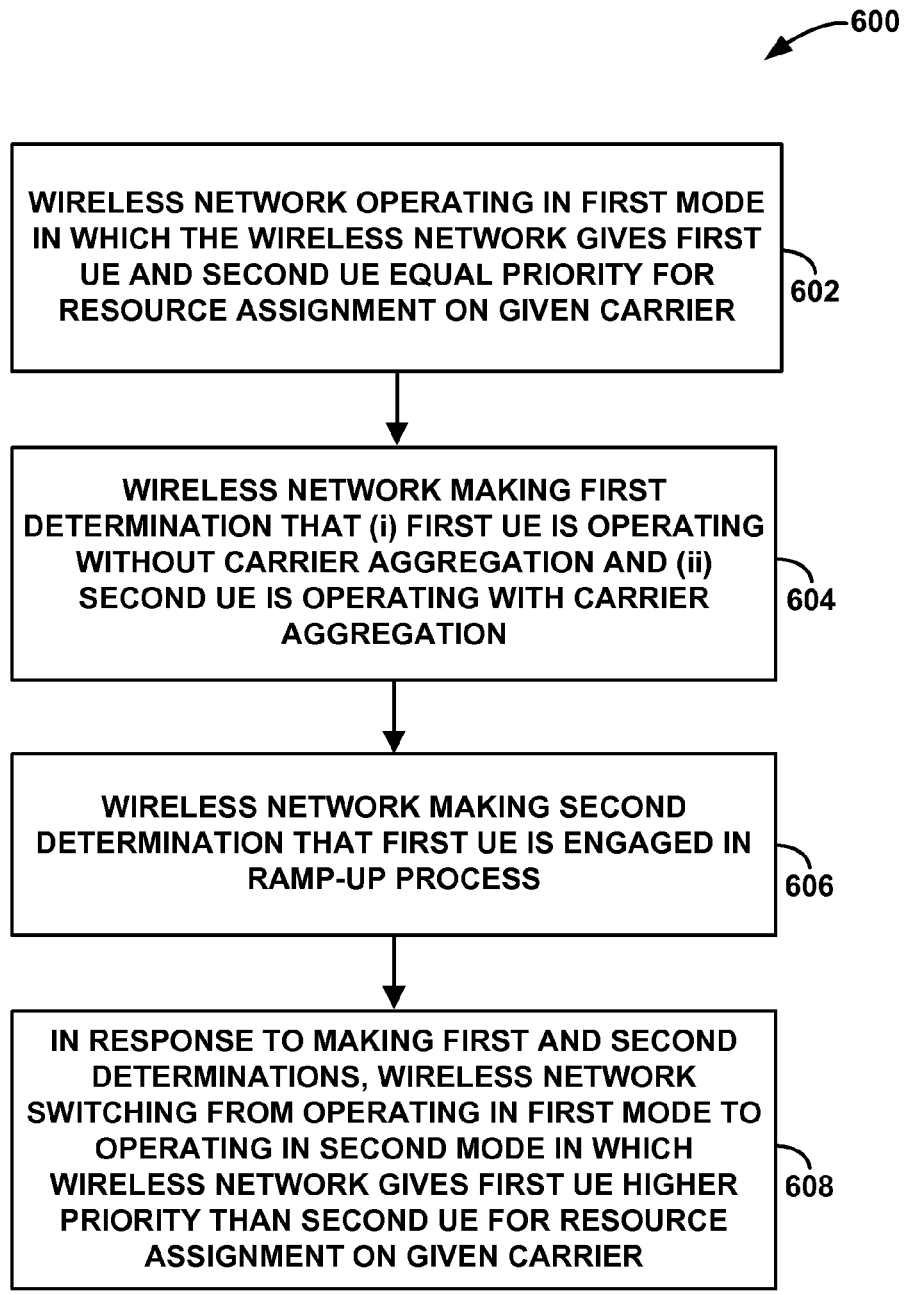
FIG. 6 is yet another flow chart depicting functions that can be carried out in accordance with an example method.

FIG. 6 is next another flow chart depicting a method 600 that can be carried out with a network arrangement such as that shown in FIG. 1 or FIG. 2 for instance. For example, method 600 may be carried out by a wireless network such as wireless network 12. Furthermore, method 600 is similar in some respects to the method 400, and thus is not described in as great of detail. It should be explicitly noted, however, that any possibilities and permutations described above with respect to method 400 and method 500 may equally apply to method 600, and vice versa.

Method 600 may involve, at block 602, the wireless network operating in a first mode in which the wireless network gives a first UE and a second UE equal priority for resource assignment on the given carrier. Method 600 may then involve, at block 604, the wireless network making a first determination that (i) the first UE is operating without carrier aggregation and (ii) the second UE is operating with carrier aggregation. Method 600 may also involve, at block 606, the wireless network making a second determination that the first UE is engaged in a ramp-up process. Further, method 600 may involve, at block 608, in response to making the first and second determinations, the wireless network switching from operating in the first mode to operating in a second mode in which the wireless network gives the first UE higher priority than the second UE for resource assignment on the given carrier.

5. Example Benefit of the Disclosed Method and System

The proposed method and system beneficially provides an improved way to assign resources to UEs operating in a wireless network. As described above, in practice, a UE operating with carrier aggregation may have better service overall that a UE operating without carrier aggregation. Beneficially, the improved way of assigning resources may help to provide improved service for a UE operating without carrier aggregation by providing that UE priority for resource allocation. For instance, the disclosed method and system allows a UE operating without carrier aggregation to get resource-allocation priority in order to facilitate ramping-up faster, by prioritizing allocation of resources from a first set of resources to that UE as compared with allocation of resources to another UE operating with carrier aggregation. Further, by providing this improved way to assign resources to UEs, a UE operating without carrier aggregation may experience the same or substantially the same availability of overall resources as would a UE operating with carrier aggregation. Therefore, the disclosed method and system may help improve wireless quality overall a user operating a UE in the wireless network, thus increasing the user's satisfaction with the user's wireless performance.

6. Conclusion

Exemplary embodiments have been described above. Those skilled in the art will understand, however, that changes and modifications may be made to these embodiments without departing from the true scope and spirit of the invention.

We claim:

1. In a communication system comprising a wireless network that allocates, among a plurality of user equipment devices (UEs), resources from a first set of resources and a second set of resources, a method comprising:
   the wireless network operating in a first mode in which the wireless network gives a first UE and a second UE equal priority for resource assignment from the first set of resources;
   the wireless network making a first determination that (i) the first UE is operating using resources from only the first set of resources and (ii) the second UE is operating using resources from the first set of resources and the second set of resources;
   the wireless network making a second determination that the first UE is engaged in a ramp-up process;
   in response to making the first and second determinations, the wireless network switching from operating in the first mode to operating in a second mode in which the wireless network gives the first UE higher priority than the second UE for resource assignment from the first set of resources;
   after switching to operating in the second mode, the wireless network determining that the ramp-up process is complete; and
   responsive to determining that the ramp-up process is complete, the wireless network switching from operating in the second mode back to operating in the first mode in which the wireless network gives the first UE and the second UE equal priority for resource assignment from the first set of resources.

2. The method of claim 1, wherein the resources from the first set of resources comprise resources on a first carrier and not on a second carrier, and wherein the resources from the second set of resources comprise resources on the second carrier and not on the first carrier.

3. The method of claim 1, wherein the wireless network supports carrier aggregation using a combination of resources from the first set of resources and resources from the second set of resources, and wherein making the first determination that (i) the first UE is operating using resources from only the first set of resources and (ii) the second UE is operating using resources from the first set of resources and the second set of resources comprises:
   determining that the wireless network is using carrier aggregation to serve the second UE but is not using carrier aggregation to serve the first UE.

4. The method of claim 1, wherein giving the first UE and the second UE equal priority for resource assignment from the first set of resources comprises assigning the same amount of resources from the first set of resources to the first UE and to the second UE.

5. The method of claim 1, wherein giving the first UE higher priority than the second UE for resource assignment from the first set of resources comprises assigning more resources from the first set of resources to the first UE than to the second UE.

6. The method of claim 5, wherein the resources from the first set of resources comprise resource blocks, and wherein assigning more resources from the first set of resources to the first UE than to the second UE comprises assigning a greater number of resource blocks to the first UE than to the second UE.

7. The method of claim 1, wherein the wireless network is a Long Term Evolution (LTE) network.

8. In a communication system comprising a wireless network that allocates, among a plurality of user equipment devices (UEs), resources from a first set of resources and a second set of resources, a method comprising:
   the wireless network operating in a first mode in which the wireless network gives a first UE and a second UE equal priority for resource assignment from the first set of resources;
   the wireless network making a first determination that (i) the first UE is operating using resources from only the first set of resources and (ii) the second UE is operating using resources from the first set of resources and the second set of resources;
   the wireless network making a second determination that the first UE is engaged in a ramp-up process;
   in response to making the first and second determinations, the wireless network switching from operating in the first mode to operating in a second mode in which the wireless network gives the first UE higher priority than the second UE for resource assignment from the first set of resources; and
   after the first UE completes the ramp-up process, the wireless network continuing to operate in the second mode in which the wireless network gives the first UE higher priority than the second UE for resource assignment from the first set of resources.

9. The method of claim 8,
wherein giving the first UE higher priority than the second UE for resource assignment from the first set of resources comprises:
assigning (i) a first amount of resources from the first set of resources to the first UE and (ii) a second amount of resources from the first set of resources to the second UE, wherein the second amount is less than the first amount.

10. In a communication system comprising a wireless network that allocates, among a plurality of user equipment devices (UEs), resources on a given carrier, wherein the wireless network supports carrier aggregation using a combination of the given carrier and at least one other carrier, a method comprising:
the wireless network making a first determination that (i) a first UE is operating without carrier aggregation and (ii) a second UE is operating with carrier aggregation;
the wireless network making a second determination that the first UE is engaged in a ramp-up process;
in response to making the first and second determinations, the wireless network giving the first UE higher priority than the second UE for resource assignment on the given carrier;
after giving the first UE higher priority than the second UE for resource assignment on the given carrier, the wireless network determining that the ramp-up process is complete; and
responsive to determining that the ramp-up process is complete, the wireless network no longer giving the first UE higher priority than the second UE for resource assignment on the given carrier.

11. The method of claim 10, wherein the wireless network giving the first UE higher priority than the second UE for resource assignment on the given carrier comprises assigning more resources on the given carrier to the first UE than to the second UE.

12. The method of claim 11, wherein the resources on the given carrier comprise resource blocks, and wherein assigning more resources on the given carrier to the first UE than to the second UE comprises assigning a greater number of resource blocks to the first UE than to the second UE.

13. In a communication system comprising a wireless network that allocates, among a plurality of user equipment devices (UEs), resources on a given carrier, wherein the wireless network supports carrier aggregation using a combination of the given carrier and at least one other carrier, a method comprising:
the wireless network making a first determination that (i) a first UE is operating without carrier aggregation and (ii) a second UE is operating with carrier aggregation;
the wireless network making a second determination that the first UE is engaged in a ramp-up process;
in response to making the first and second determinations, the wireless network giving the first UE higher priority than the second UE for resource assignment on the given carrier; and
after the first UE completes the ramp-up process, the wireless network continuing to give the first UE higher priority than the second UE for resource assignment on the given carrier.

14. In a communication system comprising a wireless network that allocates, among a plurality of user equipment devices (UEs), resources on a given carrier, wherein the wireless network supports carrier aggregation using a combination of the given carrier and at least one other carrier, a method comprising:
the wireless network operating in a first mode in which the wireless network gives a first UE and a second UE equal priority for resource assignment on the given carrier;
the wireless network making a first determination that (i) the first UE is operating without carrier aggregation and (ii) the second UE is operating with carrier aggregation;
the wireless network making a second determination that the first UE is engaged in a ramp-up process;
in response to making the first and second determinations, the wireless network switching from operating in the first mode to operating in a second mode in which the wireless network gives the first UE higher priority than the second UE for resource assignment on the given carrier;
after switching to operating in the second mode, the wireless network determining that the ramp-up process is complete; and
responsive to determining that the ramp-up process is complete, the wireless network switching from operating in the second mode back to operating in the first mode.

15. The method of claim 14, wherein giving the first UE and the second UE equal priority for resource assignment on the given carrier comprises assigning the same amount of resources on the given carrier to the first UE and to the second UE.

16. The method of claim 14, wherein giving the first UE higher priority than the second UE for resource assignment on the given carrier comprises assigning more resources on the given carrier to the first UE than to the second UE.

\* \* \* \* \*